(12) United States Patent
Lee et al.

(10) Patent No.: US 9,942,521 B2
(45) Date of Patent: Apr. 10, 2018

(54) AUTOMATIC CONFIGURATION OF CAMERAS IN BUILDING INFORMATION MODELING

(75) Inventors: Mi Suen Lee, Hales Corners, WI (US); Paul Popowski, Lake Mills, WI (US)

(73) Assignee: Honeywell International Inc., Morristown, NJ (US)

( * ) Notice: Subject to any disclaimer, the term of this patent is extended or adjusted under 35 U.S.C. 154(b) by 1076 days.

(21) Appl. No.: 13/350,293

(22) Filed: Jan. 13, 2012

(65) Prior Publication Data

US 2013/0182103 A1      Jul. 18, 2013

(51) Int. Cl.
*H04N 7/18*      (2006.01)
*G08B 13/196*   (2006.01)
*G06T 7/73*      (2017.01)

(52) U.S. Cl.
CPC .............. *H04N 7/181* (2013.01); *G06T 7/75* (2017.01); *G08B 13/19645* (2013.01); *G06T 2207/10004* (2013.01); *G06T 2207/30244* (2013.01)

(58) Field of Classification Search
CPC .. H04N 7/18; G08B 13/19645; G06T 7/0046; G06T 2207/30244; G06T 2207/10004
USPC .......... 348/139, 218.1; 703/1; 707/769, 825; 715/735
See application file for complete search history.

(56) References Cited

U.S. PATENT DOCUMENTS

| | | | | |
|---|---|---|---|---|
| 2009/0262206 A1* | 10/2009 | Park | ................ | G08B 13/19641 348/218.1 |
| 2011/0276886 A1* | 11/2011 | Hall et al. | ..................... | 715/734 |
| 2011/0282901 A1* | 11/2011 | Marks et al. | ................. | 707/769 |
| 2012/0203806 A1* | 8/2012 | Panushev | ....................... | 707/825 |
| 2012/0259594 A1* | 10/2012 | Khan | ..................... | G06T 13/60 703/1 |

OTHER PUBLICATIONS

Tsai, Roger Y. —"A Versatile Camera Calibration Technique for High-Accuracy 3D Machine Vision Metrology Using Off-the-Shelf TV Cameras and Lenses", IEEE Journal of Robotics and Automation, vol. RA-3, No. 4, Aug. 1987, pp. 323-344.
Zhang, Zhengyou—"A Flexible New Technique for Camera Calibration", IEEE Transactions on Pattern Analysis and Machine Intelligence, last updated Dec. 5, 2009, pp. 1-21.
Salvi, Joaquim et al., "A Review of Recent Range Image Registration Methods With Accuracy Evaluation", Science Direct Image and Vision Computing 25 (2007), 578-596.

* cited by examiner

*Primary Examiner* — Mohammed Rahaman
*Assistant Examiner* — Richard Carter
(74) *Attorney, Agent, or Firm* — Wood, Phillips, Katz, Clark & Mortimer

(57) ABSTRACT

There is disclosed herein a system for automatic configuration of cameras in a Building Information Model (BIM) comprising a programmed BIM processing system. A plurality of input ports are distributed at select locations in the building. A database stores a network location map identifying locations of the input ports. The BIM processing system is operated to detect a camera connected to one of the input ports and reading camera image data; determine possible building areas in the camera's field of view based on location of the one of the input ports and extracting features from the stored building models for the determined possible building areas, and establishing mapping between the camera image data and the extracted features to determine actual location of the camera in the building and store camera location data in the database.

20 Claims, 4 Drawing Sheets

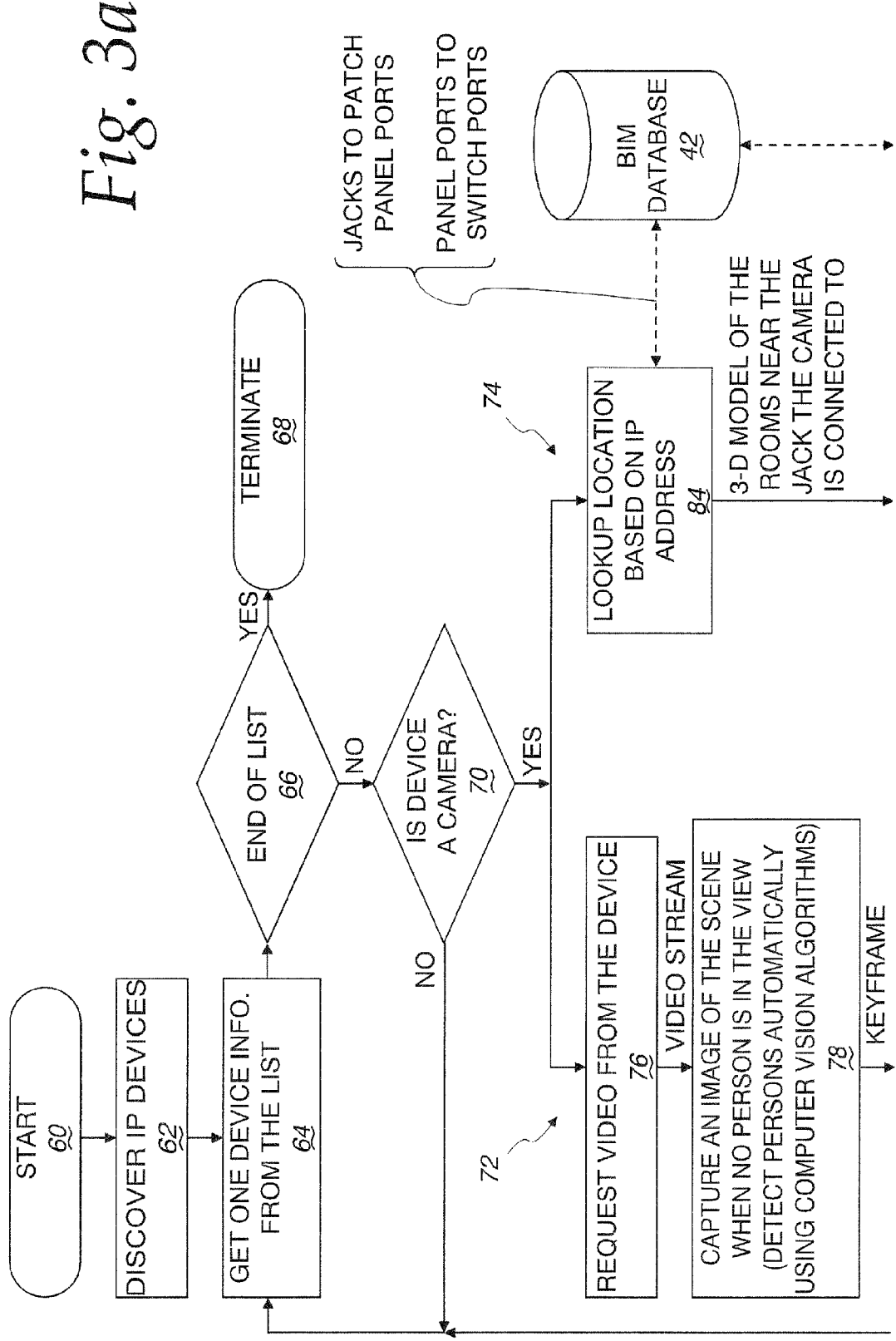

AUTOMATIC CONFIGURATION OF CAMERAS IN BUILDING INFORMATION MODELING

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This application relates to Building Information Modeling and, more particularly, to automatic configuration of cameras.

BACKGROUND

Building Information Modeling (BIM) is used for generating and managing building data during life cycle of the building. BIM relates to representing a design as objects that carry their geometry, relations and attributes. BIM allows for extracting different views from a building model for drawing production and other uses. It provides a common information infrastructure and a set of processes to allow users to share context. A Building Information Model (also abbreviated BIM) evolves over time such as through the design, construction and management phases. There is one accepted international standard, the Industry Foundation classes (IFC) ISO PAS 16739. IFC is multi-layered and the object model of architecture provides a modular structure for the development of model components. There are four conceptual layers within the architecture, which use a strict referencing hierarchy. Within each conceptual layer a set of model schemas is defined.

Internet protocol (IP) cameras are often added to facilities managed by a BIM. Even though it is possible to automatically discover the IP addresses of all the added cameras, it remains cumbersome to set up the cameras in the BIM as one still needs to observe the video from each camera to decide exactly where it is installed in the facility. In facilities where rooms are of similar size and décor, it may be difficult for the BIM administrator to decide which room is being viewed.

The present application automates the configuration of cameras in BIM, making the installation process more efficient and less susceptible to human error.

SUMMARY

The system and method disclosed herein make use of camera calibration to automate the configuration of cameras in Building Information Modeling (BIM).

In one aspect, there is disclosed a method for automatic configuration of cameras in a Building Information Model (BIM), comprising providing a programmed BIM processing system including a processor and associated memory for managing building data; connecting a plurality of input ports to the BIM processing system, the input ports being distributed at select locations in the building; storing a database including building models and storing a network location map identifying locations of the input ports; detecting a camera connected to one of the input ports and reading camera image data from the camera; determining possible building areas in the cameras field of view based on location of the one of the input ports and extracting stored building model data for the determined possible building areas; and establishing mapping between the camera image data and the stored building models to determine actual location of the camera in the building and store camera location data in the database.

It is a feature that detecting a camera comprises detecting a video camera and reading camera image data from the video camera comprises selecting an image frame. The image frame may be selected when no person is in the field of view.

It is another feature that each input port includes an associated unique identifier stored in the network location map and the possible building areas are determined based on the unique identifier of the one of the input ports.

It is another feature that establishing mapping comprises extracting features selected from edges, corners, rectangles and the like from the camera image data and/or features selected from edges, corners, rectangles and the like from the stored building models. The mapping step comprises for each possible building area where the camera could be mounted establishing correspondence between features extracted from the camera image data and features extracted from the stored building models. This may further comprise computing camera parameters to determine correspondence between features extracted from the camera image data and features extracted from the stored building models or determining image distance between projected points and image points to determine correspondence between features extracted from the camera image data and features extracted from the stored building models.

It is another feature that similar possible building areas include unique elements and the unique elements are used to distinguish between the similar possible building areas.

There is also disclosed herein a system for automatic configuration of cameras in a BIM comprising a programmed BIM processing system including a processor and associated memory for managing building data. A plurality of input ports are operatively connected to the BIM processing system. The input ports are distributed at select locations in the building. A database is operatively associated with the BIM processing system storing building models and storing a network location map identifying locations of the input ports. The BIM processing system is operated to detect a camera connected to one of the input ports and read camera image data from the camera, to determine possible building areas in the cameras field of view based on location of the one of the input ports and to extract features from the stored building models for the determined possible building areas. The BIM processing system establishes mapping between the camera image data and the extracted features from the stored building models for the determined possible building areas to determine actual location of the camera in the building and store camera location data in the database.

Other features and advantages will be apparent from a review of the entire specification, including the appended claims and drawings.

DETAILED DESCRIPTION

The disclosed solution for configuration of cameras in Building Information Modeling (BIM) makes use of camera calibration to automate the configuration of cameras in BIM. Camera calibration is the process of finding the true parameters of the camera that produced a given image. Given the coordinates of a set of 3-D points in the 2-D image, camera calibration algorithms recover the intrinsic camera parameters including focal length, image width and height, and principal point, and the extrinsic parameters include 3-D rotation and translations that transform the 3-D world coordinates to the camera coordinates. By computing the best camera parameters that match the camera or video to the 3-D building model, the disclosed system and method can automatically determine where a newly added camera is installed and set it up correctly in the BIM. BIM is a data model for a building that has the capability to produce a graphical model. The data model enables the production of a graphical model and a specific perspective view of that graphical model. As described herein, that view is compared to an image obtained from a camera. Matching walls, doors, windows and the perspective of those elements between the specific view of the graphical model and the image are used to determine which camera is in which location. For example, a camera may be mounted 9 ft in the air on the ceiling and 3 ft from the north wall and 2 ft from the east wall and is facing southwest. The view the camera should see can be created when rendering the information about the other building elements (walls, doors, windows, etc). This rendered view or model view would then be compared to an image from the real camera so that they can be matched.

The present application is not specific to any particular methodology for camera calibration. Examples of camera calibration methodology are disclosed in R. Y. Tsai, "An Efficient and Accurate Camera Calibration Technique for 3D Machine Vision". Proc IEEE Conference on Computer Vision and Pattern Recognition, Miami Beach, Fla., pp. 364-374, 1986 and Z. Zhang, "A flexible new technique for camera calibration," IEEE Transactions on Pattern Analysis and Machine Intelligence, Vol. 22, No. 11, pages 1330-1334, 2000, each of which is incorporated by reference herein.

Figure 1:
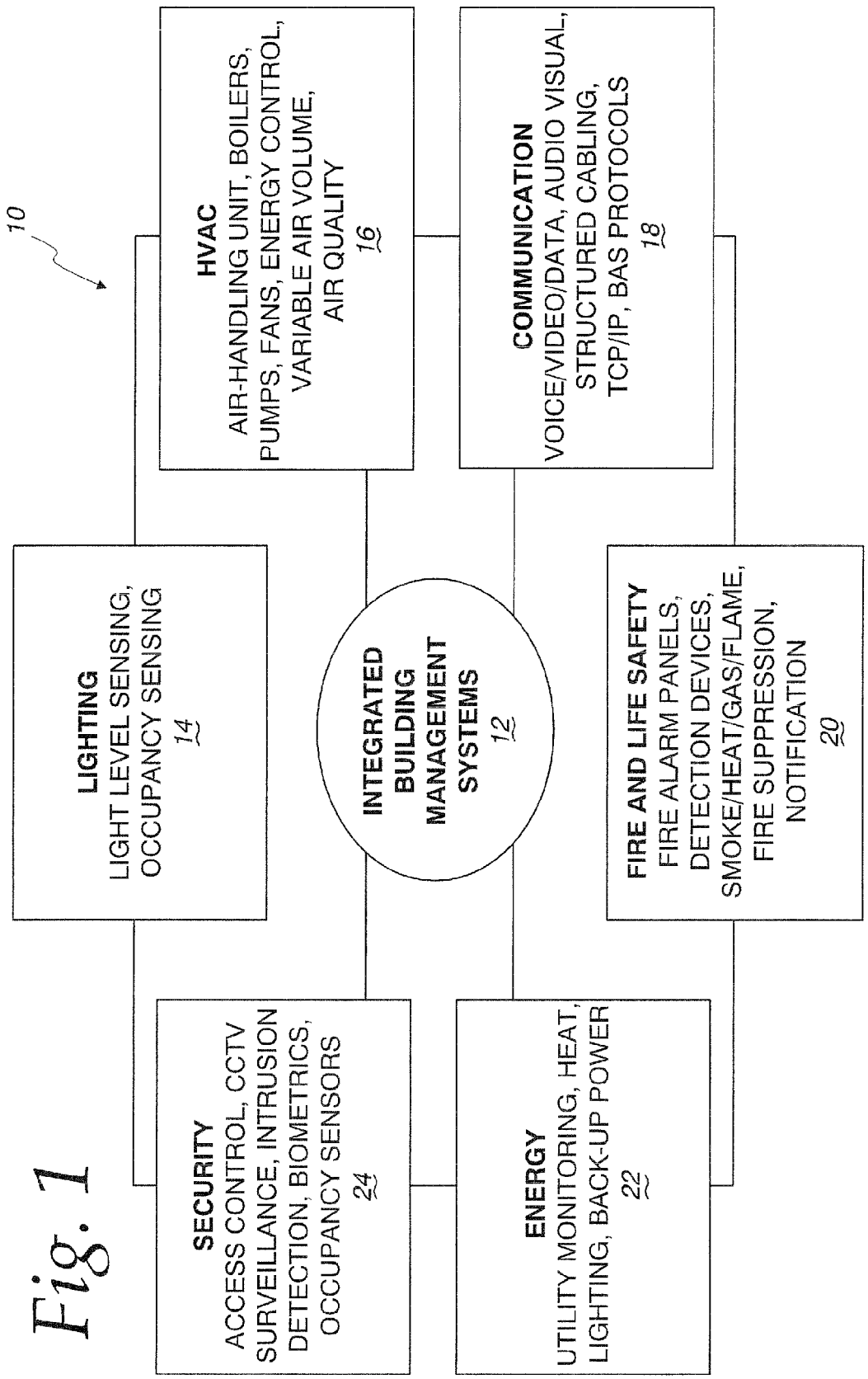
FIG. 1 is a generalized block diagram illustrating a Building Information Model.

Referring to FIG. 1, a block diagram illustrates interrelationship of systems in a building using a Building Information Model (BIM) represented generally at 10. The BIM 10 uses technology for integrated building management systems 12 that interacts directly with various security and building automation systems and information sources including lighting systems 14, HVAC systems 16, communication systems 18, fire and life safety systems 20, energy systems 22 and security systems 24. The building management system 12 provides direct access to all of the applications which also include interconnections as necessary, or desired.

This application is not directed specifically to a BIM per se, but rather the automatic configuration of cameras being added into a BIM.

Figure 2:
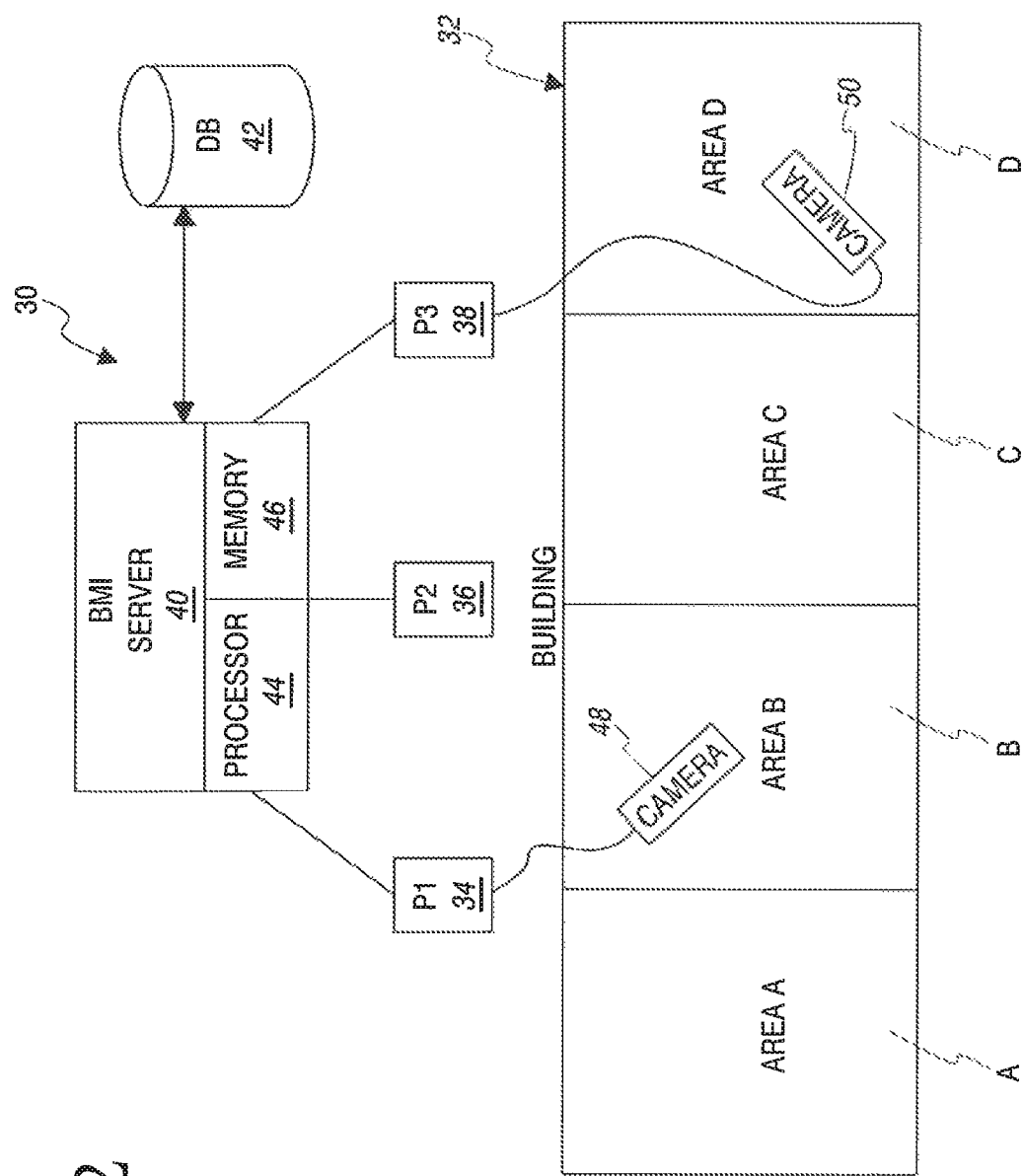
FIG. 2 is a block diagram of a system for automatic configuration of cameras in a BIM.

FIG. 2 is a block diagram illustration of a system 30 for automatic configuration of cameras in a BIM associated with a building 32. The building 32 is represented by numerous rooms and the like represented by building areas A, B, C, and D. The system 30 includes a first input port 34, a second input port 36 and a third input port 38. In the illustrated embodiment, the first input port 34 is located proximate building areas A and B, the second input port 36 is located proximate building areas B and C, and the third input port 38 is located proximate the building areas C and D. The input ports 34, 36 and 38 are used for connecting input devices, such as cameras, to the system 30. As is apparent, the building 32 could include any number of building areas and the system 30 could include as many input ports as necessary.

Each of the input ports 34, 36 and 38 is connected to a BIM server 40 operatively associated with a BIM database 42. The BIM server 40 comprises a programmed processing system including a processor 44 and associated memory 46 for managing building data. The database 42 stores 3-D models for the building 32 and stores a network location map cross referencing location in the building 32 of the input ports 34, 36 and 38. Each of the input ports 34, 36 and 38 would be represented by an input jack connected to a particular patch panel port and the patch panel port connected to a particular switch port. The 3-D model would include data such as edges, corners, rectangles and the like for each of the building areas A, B, C and D in the form of 3-D features.

As described herein, a camera such as cameras 48 and 50 are selectively connected to any of the input ports. The cameras 48 and 50 may be Internet Protocol (IP) cameras, as are known. An IP camera is a type of digital video camera commonly employed for surveillance that can send and receive data via a computer network and the Internet. Each such IP camera has an associated IP address.

In an exemplary illustration, the first IP camera 48 is connected to the first input port 34 and the second IP camera 50 is connected to the third input port 38. The BIM server 40 is programmed to use the network location map stored in the database 42, look up which jack, panel port and switch are seeing the IP camera 48 or 50 and determine the approximate location of the IP camera. For example, with respect to the first IP camera 48, the BIM server 40 determines the approximate location as being associated with the building area A or the building area B. The IP camera 48 produces a video stream uploaded to the BIM server 40 which automatically selects an image frame when no person is in view. The BIM server 40 extracts features such as edges, corners, rectangles, etc. from the camera image. The BIM server 40 then extracts 3-D features including edges, corners and rectangles from the stored 3-D model for building areas A and B representing locations where the camera 48 might be mounted owing to its being connected to the first input port 34. For each of the possible building areas A and B, the BIM server 40 establishes mapping between 3-D features extracted from the building model stored in the database 42 and features extracted from the captured camera image. This is done by establishing correspondence between features extracted from the camera image data and features extracted from the stored building models. Camera calibration methods, discussed above, are applied to compute the camera parameters. The BIM server computes reprojection errors, i.e., the image distance between projected points and image points, to measure how well the 3-D model features match the image features. The camera 48 is then assigned to the upper left corner of building area B where its 3-D model features best match the image features producing the smallest reprojection error.

The system 30 is similarly used to automatically configure the second IP camera 50 which is connected to the third input port 38 and determine there is located in the lower left corner of building area D. Likewise, with both cameras, the BIM server can determine the camera location and orientation.

Figure 3B:
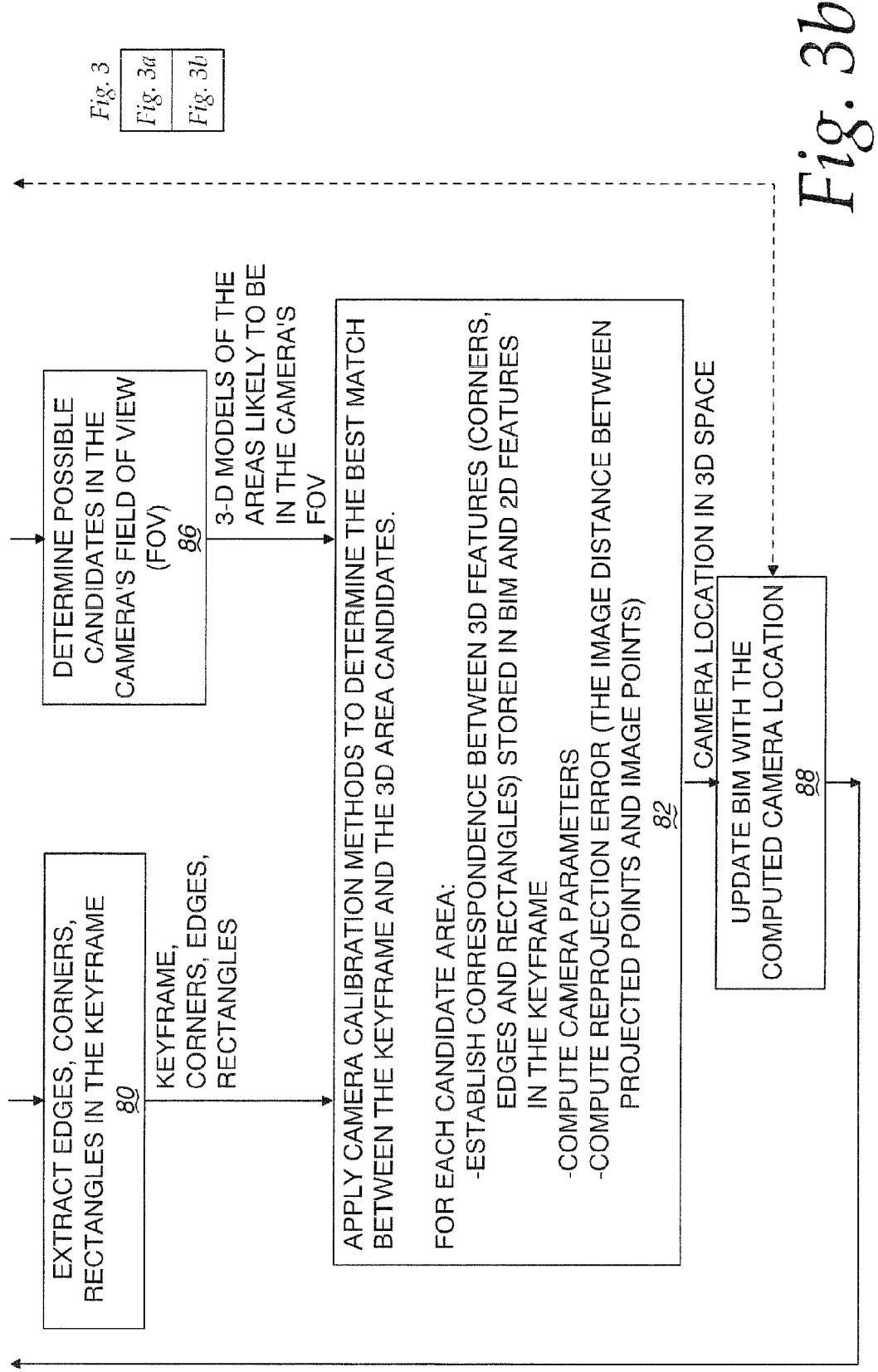
FIG. 3 is a flow diagram illustrating a method for automatic configuration of cameras in a BIM.

FIG. 3 illustrates a flow diagram for a program implemented in the BIM server 40 for automatic configuration of cameras in the BIM system 30. The program begins at a start node 60 and a block 62 discovers if an IP device has been connected to one of the input ports 34, 36 or 38. Each such device would have a corresponding IP address and particular device features, as is known. A block 64 retrieves device information from a list which would be stored in the memory 46 or the database 42. As there may be plural devices connected, the program may have to route through a list among the different devices. A decision block 66 determines if the program has reached the end of the list. If so, then the program terminates at a node 68. If not, a decision block 70 determines whether the discovered IP device is a camera. If not, then the program loops back to the block 64. If so, then the program follows through two parallel routes. The first route 72 is a video path that processes the camera image, while the second route 74 is a stored 3-D building model path that processes data stored in the database 42.

Beginning with the video path 72, a block 76 requests video from the detected camera, such as the camera 48. Upon receiving a video stream, a block 78 captures an image of the scene when no person is in view. Particularly, the program can detect persons automatically using known computer vision algorithms. A keyframe of the camera image is then provided to a block 80 which extracts edges, corners and rectangles in the keyframe with this information being provided to a block 82.

In the stored 3-D building model path 74, the program begins at a block 84 which looks up the location of the detected camera 48 based on the jack, panel port and switch for the first input port 34 using the network location map in the database 42. The IP camera 48 is identified by its IP address. The program retrieves the possible building area location data from the database 42. The 3-D model of the areas A and B, proximate the input port 34 that the camera 48 is connected to, are provided to a block 86 which determines possible candidates for location in the camera's field of view. The 3-D models of the areas likely to be in the camera's field of view are then provided to the block 82.

The block 82 applies a camera calibration methodology to determine the best match between the keyframe and the 3-D area candidates. Particularly, the program makes a comparison for each 3-D area candidate and establishes correspondence between 3-D features, such as corners, edges and rectangles stored in the database 42 and 2-D features in the keyframe, computes camera parameters and computes reprojection errors. The program thus determines the camera location in 3-D space in the building area B, as shown in FIG. 2. The BIM database 42 is updated with the computed camera location at a block 88 and the program loops back to the block 64.

Thus, as described, the system and method described herein make use of camera calibration to automate the configuration of cameras in the BIM. Variations of the system are also contemplated. If more than one camera is added to the system, then the assignment of a camera location pair could be improved by applying optimization techniques, such as dynamic programming. If the camera is a pan tilt zoom camera (PTZ camera), the method can be applied to video for multiple fixed positions to produce more robust results.

In facilities where some rooms are of similar size and décor, the method may not readily produce unique camera location pairing. In such cases, it is advantageous to introduce unique elements in different rooms needed to resolve the ambiguity. The unique element could be a permanent fixture mounted in a room or a temporary presence of a person presenting an RFID at RHD readers closest to the room where the camera is mounted.

If the camera also provides 3-D range data, then the system 30 can apply range image registration methods to evaluate the matching of the image features and BIM features, such as disclosed in Salvi J. Matabosch C., Fofi D., Forest J. "A review of recent range image registration methods with accuracy evaluation" (2007) Image and Vision Computing, 25 (5), pp. 578-596, the specification of which is incorporated by reference herein.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The present system and method have been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions. None of the methods according to various aspects disclosed herein is limited to performing the steps thereof in any particular order.

The invention claimed is:

1. A method for automatic configuration of cameras in a Building Information Model (BIM), comprising:
   providing a programmed BIM processing system including a processor and associated memory for managing building data;
   connecting a plurality of input ports to the BIM processing system, the input ports being distributed at select locations in the building;
   storing a database including building models and storing a network location map identifying locations of the input ports;
   detecting a camera connected to one of the input ports and reading camera image data from the camera;

determining possible building areas in the cameras field of view based on location of the one of the input ports and extracting stored building model data for the determined possible building areas; and establishing mapping between the camera image data and the stored building models by comparing features in the camera image data to features from the extracted stored building model data for the determined possible building areas to determine actual location of the camera in the building and store camera location data in the database.

2. The method of claim 1 wherein detecting a camera comprises detecting a video camera and reading camera image date from the video camera comprises selecting an image frame.

3. The method of claim 2 wherein selecting the image frame comprises selecting an image frame when no person is in the field of view.

4. The method of claim 1 wherein each input port includes an associated unique identifier stored in the network location map and the possible building areas are determined based on the unique identifier of the one of the input ports.

5. The method of claim 1 wherein establishing mapping between the camera image data and the stored building models comprises extracting features selected from edges, corners, rectangles and the like from the camera image data.

6. The method of claim 5 wherein establishing mapping between the camera image data and the stored building models comprises extracting features selected from edges, corners, rectangles and the like from the stored building models for the determined possible building areas.

7. The method of claim 6 wherein the mapping step comprises for each possible building area where the camera could be mounted establishing correspondence between features extracted from the camera image data and features extracted from the stored building models.

8. The method of claim 7 further comprising computing camera parameters based on correspondence between features extracted from the camera image data and features extracted from the stored building models.

9. The method of claim 7 further comprising determining image distance between projected points and image points for the corresponding features extracted from the camera image data and features extracted from the stored building models.

10. The method of claim 1 wherein similar possible building areas include unique elements and the unique elements are used to distinguish between the similar possible building areas.

11. A system for automatic configuration of cameras in a Building Information Model (BIM), comprising:

a programmed BIM processing system including a processor and associated memory for managing building data;

a plurality of input ports operatively connected to the BIM processing system, the input ports being distributed at select locations in the building;

a database operatively associated with the BIM processing system storing building models and storing a network location map identifying locations of the input ports; and operating the BIM processing system to detect a camera connected to one of the input ports and reading camera image data from the camera; determine possible building areas in the camera's field of view based on location of the one of the input ports and extracting features from the stored building models for the determined possible building areas, and establishing mapping between the camera image data and the extracted features from the stored building models by comparing features in the camera image data to the extracted features from stored building models for the determined possible building areas to determine actual location of the camera in the building and store camera location data in the database.

12. The system of claim 11 wherein detecting a camera comprises detecting a video camera and reading camera image date from the video camera comprises selecting an image frame.

13. The system of claim 12 wherein selecting the image frame comprises selecting an image frame when no person is in the field of view.

14. The system of claim 11 wherein each input port includes an associated unique identifier stored in the network location map and the possible building areas are determined based on the unique identifier of the one of the input ports.

15. The system of claim 11 wherein establishing mapping between the camera image data and the stored building models comprises extracting features selected from edges, corners, rectangles and the like from the camera image data.

16. The system of claim 15 wherein establishing mapping between the camera image data and the stored building models comprises extracting features selected from edges, corners, rectangles and the like from the stored building models for the determined possible building areas.

17. The system of claim 16 wherein the mapping step comprises for each possible building area where the camera could be mounted establishing correspondence between features extracted from the camera image data and features extracted from the stored building models.

18. The system of claim 17 further comprising computing camera parameters based on the correspondence between features extracted from the camera image data and features extracted from the stored building models.

19. The system of claim 17 further comprising determining image distance between projected points and image points for the corresponding features extracted from the camera image data and features extracted from the stored building models.

20. The system of claim 11 wherein similar possible building areas include unique elements and the unique elements are used to distinguish between the similar possible building areas.

* * * * *